(12) United States Patent
Barelko et al.

(10) Patent No.: US 7,060,651 B2
(45) Date of Patent: Jun. 13, 2006

(54) SILICA-RICH CARRIER, CATALYZER FOR HETEROGENEOUS REACTIONS AND METHOD FOR THE PRODUCTION THEREOF

(75) Inventors: Viktor Vladimirovich Barelko, Chernogolovka (RU); Bair Sydypovich Balzhinimaev, Novosibirsk (RU); Sergei Petrovich Kildyashev, Novosibirsk (RU); Mikhail Grigorievich Makarenko, poselok Krasnoobsk (RU); Anatoly Nikolaevich Parfenov, Moscow (RU); Ljudmila Grigorievna Simonova, Novosibirsk (RU); Alexandr Viktorovich Toktarev, Berdsk (RU)

(73) Assignee: Zakrytoe Aktsionernoe Obschestvo "Kholdingovaya Katalizatornaya Kompania", Novosibirsk (RU)

( * ) Notice: Subject to any disclaimer, the term of this patent is extended or adjusted under 35 U.S.C. 154(b) by 232 days.

(21) Appl. No.: 10/169,185

(22) PCT Filed: Dec. 4, 2000

(86) PCT No.: PCT/RU00/00499

§ 371 (c)(1),
(2), (4) Date: Jun. 27, 2002

(87) PCT Pub. No.: WO01/51203

PCT Pub. Date: Jul. 19, 2001

(65) Prior Publication Data

US 2003/0082088 A1    May 1, 2003

(30) Foreign Application Priority Data

Dec. 28, 1999   (RU) .................................. 99126901

(51) Int. Cl.
| | |
|---|---|
| B01J 21/08 | (2006.01) |
| B01J 21/12 | (2006.01) |
| B01J 21/14 | (2006.01) |
| B01J 23/00 | (2006.01) |
| B01J 23/32 | (2006.01) |
| B01J 23/40 | (2006.01) |
| B01J 23/42 | (2006.01) |
| B01J 23/58 | (2006.01) |
| B01J 23/72 | (2006.01) |
| B01J 23/56 | (2006.01) |

(52) U.S. Cl. ...................... 502/240; 502/241; 502/242; 502/243; 502/244; 502/245; 502/254; 502/255; 502/256; 502/257; 502/258; 502/259; 502/260; 502/261; 502/262; 502/263; 502/305; 502/308; 502/309; 502/310; 502/313; 502/314; 502/315; 502/316; 502/317; 502/318; 502/319; 502/320; 502/321; 502/322; 502/323; 502/324; 502/325; 502/326; 502/327; 502/330; 502/331; 502/332; 502/333; 502/334; 502/335; 502/336; 502/337; 502/338; 502/339; 502/344; 502/345; 502/346; 502/347; 502/348; 502/349; 502/350; 502/351; 502/352

(58) Field of Classification Search ........ 502/240–245, 502/254–263, 305, 308–310, 313–327, 330–339, 502/344–352, 355, 407, 414–415, 439

See application file for complete search history.

(56) References Cited

U.S. PATENT DOCUMENTS

| | | | |
|---|---|---|---|
| 4,038,214 A | 7/1977 | Gotoh et al. | 502/257 |
| 4,933,307 A | 6/1990 | Marshall et al. | 501/39 |
| 5,028,352 A * | 7/1991 | Hietala et al. | 516/111 |
| 5,155,083 A | 10/1992 | Yoshida et al. | 502/242 |
| 5,217,939 A | 6/1993 | Campbell | 502/339 |
| 5,552,360 A | 9/1996 | Farrauto et al. | 502/178 |
| 5,599,759 A * | 2/1997 | Inagaki et al. | 502/80 |
| 6,106,802 A * | 8/2000 | Lujano et al. | 423/702 |
| 6,485,702 B1 * | 11/2002 | Lujano et al. | 423/702 |

FOREIGN PATENT DOCUMENTS

| | | |
|---|---|---|
| DE | 4242227 | 6/1994 |
| EP | 0393356 | 10/1990 |
| RU | 2010597 | 4/1994 |

$^{29}$Si MAS NMR spectra of silica-rich supports

| RU | 2040964 | 8/1995 |
| RU | 2069584 | 11/1996 |
| RU | 2081898 | 6/1997 |
| RU | 2012460 | 6/2002 |

OTHER PUBLICATIONS

English translation of the claims of RU 2069584 dated Nov. 27, 1996.
English translation of the claims of RU 2040964 dated Aug. 9, 1995.
English translation of the claims of DE 42 42 227 dated Jun. 16, 1994.
English translation of the claims of EP 0 393 356 dated Oct. 24, 1990.
English translation of the claims of RU 2010597 dated Apr. 15, 1994.
English translation of the claims of RU 2081898 dated Mar. 29, 1995.
Jun, Y., et al. "Metal Oxide Catalysts Reinforced with Fiberglass" *Referativnyj Zhurnal "Khimiya"*, p. 18, (1974).
Iler, R.K. "The Chemistry of Silica: Solubility, Polymerization, Colloid and Surface Properties and Biochemistry of Silica" p. 480, p. 706, (1982).
Zhdanov, C.P. "Porous Glasses: Silica Adsorbents With Finely Adjustable Structural Parameters" *Zhurnal Vsesojuznogo Khimicheskogo Obshchestva . . . Mendeleeva*, vol. 34, No. 3, p. 10, 11, (1989).
Mastikin, V.M, et al. "Nuclear Magnetic Resonance . . . " Novosibirsk, p. 100, (1992).
Engelhardt, G., et al. "High-Resolution Solid-State NMR of Silicates and Zeolites" p. 106-107, (1987).
Sears, G.W., Jr. "Determination of Specific Surface Area of Colloidal Silica by Titration with Sodium Hydroxide" *Analytical Chemsitry*, vol. 28, No. 12, p. 1981-1983, (1956).
Paukshtis, E.A., et al. "Successes in Chemistry" p. 426, (1983).
Peri, J.B. "Infrared Study of OH and $NH_2$ Groups on the Surface of a Dry Silica Aerogel" *J. of Physical Chemistry*, vol. 70, No. 9, p. 2937-2939, (1966).
Boreskov, G.K. "Catalysis in Sulphuric Acid Production" p. 89-90, 154, (1954).

* cited by examiner

*Primary Examiner*—Cam N. Nguyen
(74) *Attorney, Agent, or Firm*—Ladas & Parry LLP (57) ABSTRACT

A silica-rich support and a catalyst containing the silica-rich support and a catalytic component. The support has a specific structure characterized by a set of claimed physicochemical properties: in the $^{29}Si$ MAS NMR spectrum the state of silicon is characterized by the presence of lines with chemical shifts $-100\pm3$ ppm (line $Q^3$) and $-110\pm3$ ppm (line $Q^4$), with the ratio of the integral intensities of the lines $Q^3/Q^4$ of from 0.7 to 1.2 (FIG. 1); in the IR spectrum there is an absorption band of hydroxyl groups with the wave number 3620–3650 $cm^{-1}$ and half-width 65–75 $cm^{-1}$ (FIG. 2); the carrier has a specific surface area, as measured by the BET techniques from the thermal desorption of argon, $S_{AR}$=0.5–30 $m^2/g$ and the surface, as measured by alkali titration techniques, $S_{Na}$=10–250 $m^2/g$, with $S_{Na}/S_{Ar}$=5–30.

23 Claims, 2 Drawing Sheets

Fig. 1 $^{29}$Si MAS NMR spectra of silica-rich supports

Fig. 2. IR spectra of silica-rich supports

SILICA-RICH CARRIER, CATALYZER FOR HETEROGENEOUS REACTIONS AND METHOD FOR THE PRODUCTION THEREOF

FIELD OF THE ART

The present invention relates to supports for use in various fields of the art and to catalysts for processes of deep oxidation of hydrocarbons (neutralization of exhaust gases), selective reduction of nitrogen oxides, hydrogenation (acetylene, nitrobenzene), oxidation of sulfur dioxide (in production of sulfuric acid), partial oxidation of hydrocarbons (epoxidation of ethylene and propylene), conversion of ammonia (in production of nitric and hydrocyanic acid), etc.

BACKGROUND OF THE INVENTION

Usually catalysts for these processes are active metals, oxides or salts deposited on supports that are amorphous or crystalline oxides of 2, 3, 4 Group elements, for instance, supports based on silica, which are characterized by high chemical and thermal stability, by the possibility of controlling within a wide range the specific surface and porous structure thereof, and of making products of various shapes: powders, cylindrical or spherical granules, single- or multi-channel monoliths, woven and nonwoven materials manufactured from fine fibers.

The most important functions of the support are the providing of a highly active state of deposited catalytic components and maximum complete utilization of the catalytic properties of these usually costly components.

This is achieved:

by maximum dispersion of catalytically active substances and by optimal distribution thereof over the surface or in the surface layers of the support;

by the effect produced by the support on the chemical and electronic state of the catalytic component to increase its performance thereof;

by increasing the effectiveness factor by using an optimal porous structure which ensures good mass transfer of substances participating in the catalytic reaction, and also by employing supports having optimal shapes: rings, multi-channel monoliths, fibrous structures manufactured in the form of woven and nonwoven materials, wool, cardboard, etc.

The most widespread method of dispersing a catalytic component is the use of supports with a high specific surface and a sufficiently high interaction with an active component, precluding the surface diffusion and growth of the particles of the latter. Different processes have been developed for the synthesis of siliceous supports with a high specific surface, for instance, hydrolytic precipitation of silica from inorganic and organic silicon compounds, yielding very small particles (R. K. Iler, The Chemistry of Silica, Moscow, Mir Publishers, 1982, vol. 1, p. 706). However, as a rule, highly dispersed supports are characterized by a fineporous structure, which leads to reducing the effectiveness factor deu to pore diffusion restrictions.

Another technique for providing siliceous materials with a high specific surface is selective acid extraction of non-silica components from multycomponent silicate materials, e.g., from silica glasses. The acid-insoluble silica skeleton makes up porous systems with a large specific surface, so-called porous glasses (S. P. Zhdanov. //Zhurnal VKhO im. Mendeleeva, 1989, vol. 34, No. 3, pp. 298–307). The value of the specific surface area, the pore size and volume substantially depend on the conditions of leaching out, as well as on the composition and pre-treatment of starting glasses, which determine the homogeneity of heteroatoms distribution and the formation of micro-heterogeneous areas under liquation. As a rule, in leached glasses micro- and mesoporous structures are formed ($R_{pore}$<100 Å). Like in conventional supports, the presence of small pores may reduce the effectiveness factor. The providing of larger transport pores of the support substantially lowers its mechanical strength, especially when fine-fiberglass materials are used, and therefore special techniques are required in the preparation (U.S. Pat. No. 4,933,307, IPC C03C 11/00, C03C 12/00, 1990).

In most cases it is preferable to use coarsely sufficiently strong and nondispersed supports of optimal shapes, but for achieving high-activity states of catalytic components thereon it is necessary to carry out additional modifications of support. For instance, honeycomb monoliths or glass fiber woven materials are used, to which comparatively thin layers of highly dispersed oxides are deposited, which are catalysts (U.S. Pat. No. 4,038,214, IPC B01J 23/86, B01J 23/84, B01J 35/06, 1977) or serve as a support for deposition more valuable catalytic components, noble metals inclusive (U.S. Pat. No. 5,552,360, IPC B01J 21/04, 21/08, 1996; U.S. Pat. No. 5,155,083, IPC B01J 21/06, B01J 21/08, 1992). However, such techniques complicate the technology of catalysts preparation and, correspondingly, make it more expensive.

Catalytic components deposited on non-modified supports are characterized not only by their low initial dispersity, but also by insufficiently strong binding with the support, which causes high surface mobility of catalytic substances, leading to their agglomeration during operation, as well as to peeling off the surface and possible entrainment by the gas flow even in the case of medium-temperature catalytic processes. This was observed, when active metals were deposited on glass fiber woven supports. In order to eliminate this disadvantage, in RU Patent No. 2069584 (IPC B01J 23/38, 23/70, 1996) for increasing adhesion of catalytically active metals to the surface of the support at the early stages of its synthesis, the composition of the support is varied. To do that, dopping additives also from catalytically active metals and/or oxides thereof are incorporated into the support manufactured in the form of threads, fibers, woven and nonwoven materials from silicon and/or aluminum oxides. Dopping additives are used as a raw materials for preparing melt based on silicon oxide. The support fibers thus made are further subjected to weaving and leaching operations, and after that a catalytic component is deposited on the surface of the woven material.

This process is disadvantageous in a considerable part of metal being localized in the bulk of the glass fiber, and, consequently, in ineffective utilization thereof in catalysis, as well as in possible technological losses of valuable metal at the early stages of incorporating thereof. It may be supposed that dopping additives incorporated at the early stages into the bulk of the glass support cause a change in the support structure and assist in the formation of certain structures which are responsible for catalyst performance.

One of the types of structures of a silica-rich support, providing the formation of highly active catalytic species, is proposed in the present invention.

DISCLOSURE OF THE INVENTION

The object of the proposed invention is to provide silica-rich catalysts comprising a catalytic component in a highly active state, owing to employing the proposed silica-rich support with a specific structure, characterized by a set of claimed physicochemical properties and owing to a method of incorporating into this structure a catalytic component which ensures a predominant distribution thereof in the sub surface layers of the support in a highly dispersed active state resistant to sintering, agglomeration of catalytic components, to their peeling off the support, and to the effect of contact poisons.

Said object is accomplished by that for preparing catalysts it is proposed to use a silica-rich support comprising silicon oxide and nonsilica-containing oxides, for instance, aluminum oxide, sodium oxide, and the like, characterized by a set of the following physicochemical properties:

in the $^{29}$Si MAS NMR (nuclear magnetic resonance) spectrum the state of silicon in the support is characterized by the presence of lines with chemical shifts $-100\pm3$ ppm (line $Q^3$) and $-110\pm3$ ppm (line $Q^4$), with the ratio of the integral intensities of the lines $Q^3/Q^4$ from 0.7 to 1.2;

in the IR (infrared) spectrum there is an absorption band of hydroxyl groups (OH groups) with the wave number of 3620–3650 cm$^{-1}$ and half-width of 65–75 cm$^{-1}$, the content of hydroxyl groups in the matrix of the support ranging from one hydroxyl group per atom of silicon to one hydroxyl group per 2 atoms of silicon (OH/Si=1–0.5);

the support has a specific surface, as measured by the BET techniques from the thermal desorption of argon, $S_{Ar}$=0.5–30 m$^2$/g and the surface, as measured by alkali titration techniques, $S_{Na}$=10–250 m$^2$/g, with $S_{Na}/S_{Ar}$=5–30.

The combination of features claimed by us define the presence in the silica support of specific structures capable of ensuring a highly active state of the catalytic component, provided that the claimed conditions of incorporating thereof are observed.

In the $^{29}$Si MAS NMR spectrum of the claimed support lines are present with chemical shifts $-100\pm3$ ppm (line $Q^3$) and $-110\pm3$ ppm (line $Q^4$ in FIG. 1, Samples 1, 2), with the ratio of the integral intensities of the lines $Q^3/Q^4$ of from 0.7 to 1.2, which, according to literature data (Mastikhin, V. M., Lapina O. B., and Mudrakovsky I. L., Nuclear Magnetic Resonance in Heterogeneous Catalysis, Novosibirsk, Nauka, 1992, 224 pp.; Engelhardt G. and Michel D., High-Resolution Solid State NMR of Silicates and Zeolites, John Wiley @ Sons, 1987, 486 pp.), characterize the following structural states of silicon in silicate compounds. Line $Q^4$ pertains to silicon atoms in the tetrahedral oxygen environment, in whose second coordination sphere all the 4 atoms are silicon atoms, this corresponding to three-dimensional polymeric fragments from silicon-oxygen tetrahedra bonded by siloxane bonds. It is exactly such states that are realized inside monolithic globules of conventional silica, wherein polymerized silicon-oxygen tetrahedra make up a continuous three-dimensional network.

The line $Q^3$ at low content of cations of Groups 1, 2 corresponds only to silicon-oxygen tetrahedra with one OH group in the first coordination sphere. A specific feature of the claimed structures is a high $Q^3/Q^4$ ratio of 0.7 to 1.2, at which the content of hydroxyl groups (OH groups) ranges from one hydroxyl group per silicon atom to one hydroxyl group per two silicon atoms. Similar amounts of OH groups are determined by infrared spectroscopy techniques. Structures with such $Q^3/Q^4$ ratio (with other claimed features being present) may be described by a layered model, in which thin layers of 3–4 silicon-oxygen tetrahedra are separated by narrow interlayer spaces. At the interface silanol groups SiOH are located ($Q^3$ states).

The herein-claimed feature of the silica-rich support being protected and of a catalyst—an absorption band of hydroxyl groups with a wavenumber of 3620–3650 cm$^{-1}$ and half-width of 65–75 cm$^{-1}$ in the IR spectrum of the silica-rich support (FIG. 2, Samples 1, 2) is indicative of a large number of OH groups being in a geometrically constrained conditions, i.e., it confirms the presence of narrow interlayer spaces of the above-described structure.

Catalytically active components (in the form of metal cations) incorporated into interlayer spaces are subjected to a strong chemical effect of the described silica-rich support matrix, and under this effect of the support they must reveal high catalytic activity. However, diffusion restrictions may retard the incorporation of cations into the interlayer spaces and their chemisorption in the support. An increase in the insertion of catalytic components into the described support having the claimed structure is possible upon separation of the layers of silicon-oxygen fragments, if the layers are sufficiently thin (this being characteristic of high $Q^3/Q^4$ ratios) and a large number of OH groups are found in the interlayer space (this being evidenced by NMR and IR spectroscopy data), whose protons are capable of cation exchange (3620–3650 cm$^{-1}$ absorption band).

The ability of support with a comparatively low surface area ($S_{Ar}$=0.5–30 m$^2$/g) to chemisorb cations is reflected by the third feature claimed by us: the magnitude of the surface area, determined from the chemisorption of sodium cations ($S_{Na}$), is 10–250 m$^2$/g (the method of Sears, 1. G. W. Sears //Anal. Chem., 1956, vol. 28, p. 1981; 2. R. Iler, The Chemistry of Silica, Moscow, Mir Publishers, 1982, vol. 2, p. 480) at the ratio of $S_{Na}$ to the magnitude of the specific surface, as determined by the BET techniques from the adsorption of argon ($S_{Na}/S_{Ar}$=5–30). We would like to note also that the low specific surface, as determined by the BET techniques at a high fraction of $Q^3$ and a high concentration of OH groups, confirms the specific structure of the support, which may be described most adequately by a layered structure model: thin layers of silicon-oxygen tetrahedra occur intermittently with narrow spaces, wherein a large number of hydroxyl groups are localized, which under definite synthesis conditions are capable of ion exchange for the cations of catalytic components.

The claimed silica-rich support may comprise at least one of metals and/or oxides of Groups I and II of the Periodic System of the Elements in an amount of not over 1 percent by weight for improving the conditions of incorporating the catalytic component into the support having the claimed structure.

The proposed support may be prepared from various silicate materials and have the form of fibers, woven and nonwoven materials, cylindrical and spherical granules, single- and multi-channel tubes.

The claimed structures may be synthesized in various ways, for instance, with silicate materials being leached by using acid solutions, with varying the composition and structure of silicate materials, and also with varying the nature and concentration of the acid employed, the leaching and subsequent heat-treatment conditions in such a manner as to produce a structure with the claimed properties. Important conditions of forming the above-described structures are as follows:

a) homogeneous distribution of heterocations in the bulk of the starting silicon-containing material;

b) absence of coalescence of the spaces when extracting cations and/or in the course of subsequent chemical and heat treatments, this being achieved by using special techniques in the synthesis: applying of ultrasonic or magnetic fields, optimization of the temperature and composition of the liquid and gaseous medium in the leaching and subsequent heat treatment, carrying out liquid-phase operations in the pneumatic pulsed mode or with using of magnetic and ultrasonic fields.

The support after leaching contains from 60 to 99.9 percent by weight of silicon oxide, the balance being components conventional for silicate glass compositions: oxides of aluminium, magnesium, calcium, boron, etc., the amount of silica in the claimed support being preferably more than 70 percent by weight.

Hence, in the proposed support the combination of the claimed features testifies to the presence of specific loosened, pseudo-layered structures, into which catalytic components in non-equilibrium highly dispersed, and, consequently, highly active state can be incorporated and stabilized therein. We would like to note that in the silica-rich materials known to us—silica gels (FIG. 1, Sample 4) and in silicate glasses (FIGS. 1, 2, Sample 3)—structures with the combination of the physicochemical characteristics claimed by us are absent.

The proposed support is used for preparing various catalysts for heterogeneous reactions and may have any geometric forms: fibers, woven and nonwoven materials, cylindrical and spherical granules, single- and multi-channel tubes.

Using a catalytic component from the group comprising platinum, rhodium, iridium, silver, zirconium, chromium, cobalt, nickel, manganese, copper, tin, gold, titanium, iron, molybdenum and/or their oxides in an amount not exceeding 2 percent by weight (based on metal), we have obtained catalysts with an activity exceeding the activity of heretofore-known catalysts.

As an active component it is preferable to use platinum group metals, which makes it possible to prepare highly active catalysts with a small amount of the active component.

Basing on the claimed support, we propose a range of highly effective silica-rich catalysts containing as catalytic components a small amount of metals and/or their oxides, very promising for use in many chemical processes (oxidation of CO methane, propane, butane, ammonia, sulfur dioxide; selective catalytical reduction (SCR) $NO_x$; hydrogenation of vegetable oils; hydrogenation of aromatic compounds), wherein they display a higher activity than the known catalysts.

The proposed catalysts which contain as the active component at least one metal selected from the group comprising platinum, palladium, manganese, nickel, cobalt, chromium and/or oxides thereof in an amount of 0.01–1.5 percent by weight have a high activity in the process of deep oxidation of hydrocarbons.

The catalyst containing as the active compound at least one of platinum group metals and/or their oxides in an amount of 0.01–1.0 percent by weight (based on metal) demonstrates a high degree of conversion of sulfur dioxide to sulfur trioxide.

For alkylation of hydrocarbons, a catalyst is used, which contains zirconium in an amount of up to 2 percent by weight (based on metal).

The catalytic component is located in the sub surface layers of the support having the claimed structure. Additional incorporation into the catalyst of at least one compound of an element selected from Groups 1, 2, 3, 4 of the Periodic System of the Elements in an amount not exceeding 1.5% contributes to incorporating, stronger fixing and stabilizing the component in the support.

For producing catalysts with the use of the proposed support, it is necessary to meet definite optimal conditions of incorporating compounds of the catalytic compounds, leading to their localization in the claimed specific loosened, pseudo-layered structures and to stabilization of catalytic components in highly active state.

Such conditions for incorporating the catalytic component into the support structures are: using an elevated temperature from 40 to 200° C., elevated pressure of 1 to 200 atmospheres (superatmospheric pressure), using solutions of compounds of catalytic compounds, having a definite pH value (preferably 2–10), additionally incorporating into the support compounds of an element selected from Groups 1, 2, 3, 4 of the Periodic System of the Elements, simultaneously with, prior to, or after contacting the support with a solution of compounds of the catalytic component.

Elevated temperature and pressure increase the mobility of layers with respect to one another, thereby favoring their being moved away from one another and the penetration of catalytic components into the sub surface interlayer space of the support. Elevated temperature increases the diffusion of the catalytic component and intensifies the ion exchange of the protons of hydroxyl groups, found in the spaces, for the cations of the catalytic component. Compounds of Group 1, 2, 3, 4 elements, additionally incorporated into the support may play the role of "pillars" in the interlayer spaces, facilitating the incorporation of catalytic components (pillaring effects).

After contacting the support with the impregnating solution of catalytic component, the sumple is washed out with a 3–10-fold excess of water with pH 3–8 to remove catalytic component compounds weakly bound with the support surface. Then drying and heat treatment are carried out at temperatures of 100–800° C. in a gas medium or in vacuum of down to $10^{-4}$ mm Hg.

So, the use of the silica-rich support with the claimed specific structure and of the claimed process for preparing catalysts for heterogeneous reactions ensures the preparation of catalysts with a high activity, resistance to sintering, agglomeration of catalytic components, to their peeling off the support, and to the effect of contact poisons.

BRIEF DESCRIPTION OF THE DRAWINGS

In FIGS. 1, 2 and in Table 1 the properties of the claimed silica-rich supports (Samples 1, 2) and of the known supports (Samples 3, 4) are presented.

FIG. 1 shows $^{29}Si$ MAS NMR spectra (MAS stands for "magic angle spinning"). The spectra were recorded on "Bruker" MSL-400 pulsed NMR Fourier spectrometer (Germany) (magnetic field 9.4T). Magic angle spinning of the samples was carried out with the help of a high-speed device manufactured by the firm Asp-Rotor-Consult (Denmark), in rotors from silicon nitride and zirconium oxide, with the rotation frequency of 8–10 thousand Herz (FIG. 1). The $^{29}Si$ MAS NMR spectra were recorded under the following conditions:

Figure 1:
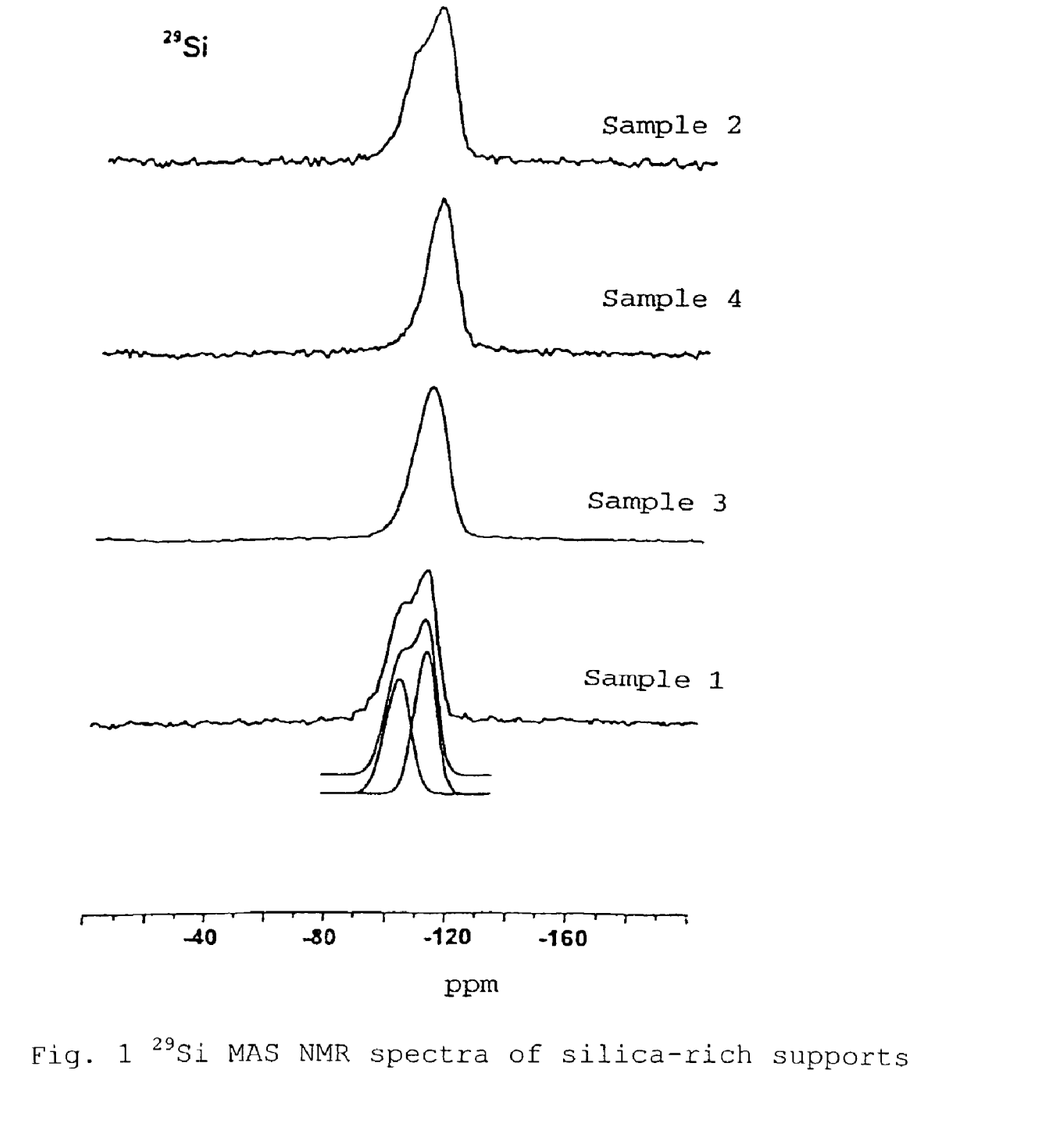

Nuclear spin ½
Isotope content 4.7%
Resonance frequency 79.49 MHz
Sweep 30 kHz
Pulse duration 4 μs
Pulse-to-pulse delay 20 s
Number of scans 300–2000
Standard-tetramethoxysilane (TMS)

The clear position of the lines enables one to evaluate with sufficient accuracy (±15%) the fractions of different structural states of silicon ($Q^3$ and $Q^4$) by denonvolution of the experimental spectrum by means of computer simulation, shown in FIG. 1 for Sample 1.

Samples 1 and 2 pertain to the claimed supports, and in the $^{29}$Si MAS NMR spectrum they have lines with chemical shifts $-100\pm3$ ppm ($Q^3$) and $-110\pm3$ ppm ($Q^4$).

Sample 3 pertains to the support described in the prior art: in RU Patent No. 2069584. Sample 3 is prepared in the following manner. Platinum chloride is added to the glass components in an amount that the content of platinum chloride in the final product should be 0.1%.

The resulting silicate glass fiber cloth support is leached in a 10–17% $H_2SO_4$ at 93–98° C. and then washed out. After drying the heat treatment are carried out at 650° C.

In the $^{29}$Si MAS NMR spectrum of Sample 3 the line $Q^4$ with the chemical shift $-110\pm3$ ppm is predominantly present: the integral intensity of the line $Q^4$ is 97%, while the integral intensity of the line $Q^3$ is ~3% (Table 1), i.e., the ratio $Q^3/Q^4=0.03$, whereas Samples 1 and 2 are characterized by the high ratio $Q^3/Q^4=0.7$–0.9.

Sample 4 is produced in the following manner.

A support is prepared by leaching silica, whose composition is 97% $SiO_2$, 2.4% $Na_2O$, 0.6% $Al_2O_3$ and which is calcined at 1200° C., the resulting product is treated with $HNO_3$ at 90° C. and washed out with water to pH 6.5–7.0. Then heat treatment is carried out in a stream of air at 250° C. for 10 hours.

This Sample 4, similarly to Sample 3, is characterized in the $^{29}$Si MAS NMR spectrum by the low ratio $Q^3/Q^4$.

Figure 2:
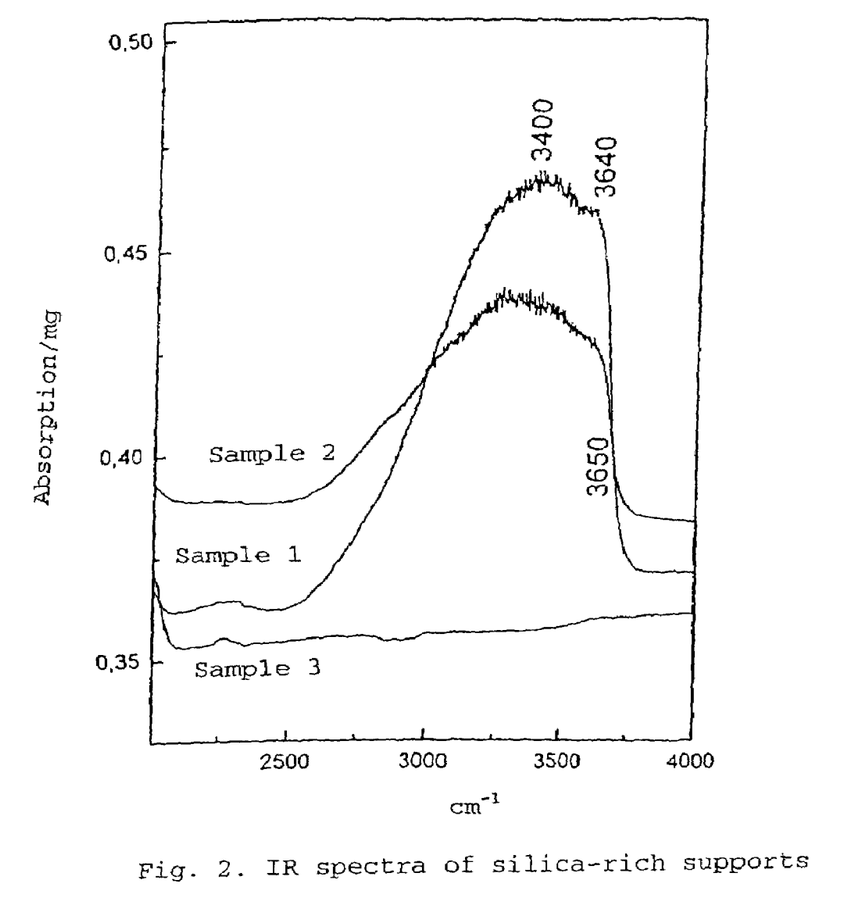

FIG. 2 shows the IR spectra of silica-rich supports.

The IR spectra were recorded at room temperature without pretreatments on a modernized IFS-113v (Bruker) spectrometer in the range of 1100–7000 cm$^{-1}$ with resolution of 4 cm$^{-1}$. The intensity was evaluated in units of optical density referenced to the weight of the sample per cm$^2$ of the beam cross-section. The concentrations of OH groups (C, μmole·g) were measured, proceeding from the intensity of the bands of stretching vibrations of OH groups in accordance with the formula $C=A/(A_o\rho)$ (E. A. Paukshtis and E. N. Yurchenko //Uspekhi Khimii, 1983, vol. 52, Issue 3, p. 426), where $\rho$ (g/cm$^2$) is twice the amount of the catalyst per cm$^2$ of the beam cross-section, since the light passes through the sample twice: before and after the reflection from the mirror; A (cm$^{-1}$) is the observed integral absorption for the band being analyzed; $A_o$ (cm/μmole) is the integral absorption coefficient which in accordance with (I. B. Peri //J. Phys. Chem., 1966, vol. 70, p. 29) for different bands was taken to be equal to:

$A_o$, cm/μmole 3 5 22 25
Absorption band, cm$^{-1}$ 3737–3740 3620–3650 3400 3300

The accuracy of evaluating the concentration of OH groups was ±30%.

In the spectra of Samples 1, 2 pertinent to the claimed support there is an absorption band of OH groups with the wave number 3620–3650 cm$^{-1}$ and half-width 65–75 cm$^{-1}$.

Sample 3 is pertinent to the known solution according to RU Patent No. 2069584. In the infrared spectrum of this Sample there is no band of absorption of OH groups with the wave number 3620–3650 cm$^{-1}$ and half-width 65–75 cm$^{-1}$.

The Best Variant of Carrying out the Invention

A support having the claimed structures is formed upon leaching silicate glass materials manufactured in the form of granules, fibers, woven and nonwoven products therefrom. The leaching conditions and the starting silicon-containing material are so selected as to obtain a support having the required claimed structure.

For producing catalysts, solutions of compounds of active elements with pH=2–10 are prepared. If necessary, elements of Groups 1, 2, 3, 4 of the Periodic System of the Elements are introduced into the impregnating solution in an amount of 1.5 percent by weight. These elements may be contained in the support before impregnating it with active elements.

The impregnation is carried out at a temperature of 40–200° C. and superatmospheric pressure of 1–200 atmospheres. After contacting the carrier with the impregnating solution, if necessary, the catalyst is washed out with a 3–10-fold excess of water with pH=3–8 to remove active component compounds weakly bound with the support. Then heat treatment is carried out at a temperature of 100–800° C. in a gas medium at atmospheric pressure or in vacuum of down to 10$^{-4}$ mm Hg. The heat treatment conditions are selected in conformity with the requirements to be met by the catalyst, depending on the reaction in which the catalyst will be tested.

The proposed silica-rich support has unique physicochemical properties. Thereby an opportunity is provided to achieve high efficiency and selectivity of catalytic processes, the catalysts are noted for enhanced chemical and thermal stability and higher strength characteristics. The catalysts have a high activity at a very low content of the catalytic component.

The catalysts prepared in accordance with the claimed process are tested in the process of deep oxidation in excess oxygen on model mixtures containing n-butane, propane and carbon oxide.

Tests in the reactions of deep oxidation of n-butane and carbon oxide are carried out under similar conditions on a flow-circulation installation at atmospheric pressure, the same space velocity of supplying the gas-and-air mixture.

The measure of the catalyst activity in the reaction of n-butane oxidation is adopted to be the rate of the n-butane oxidation reaction (cm$^3$ of $C_4H_{10}$/·g.s.·10$^{-2}$) at the temperature of 400° C. A higher rate of the reaction of deep oxidation of butane corresponds to a more active catalyst.

The measure of the catalyst activity in the reaction of oxidation of carbon oxide is adopted to be the temperature at which the degree of oxidation of carbon oxide is 85%. The lower the temperature at which the 85% oxidation of carbon oxide is reached, the higher the catalyst activity is.

Tests in the reaction of deep oxidation of propane are carried out in an isothermal flow reactor. The measure of the catalytic activity is adopted to be the degree of conversion at a definite temperature.

The catalytic activity in the reaction of oxidizing $SO_2$ into $SO_3$ is measured on a flow-type installation by following a standard procedure most widespread in the Russian practice for assessing the quality of industrial catalysts (G. K. Boreskov, Catalysis in Sulfuric Acid Production, Moscow, Goskhimizdat, 1954, p. 87). The test is carried out by the flow method with the composition of the gas mixture: 10 vol. % $SO_2$, 18.9 vol. % $O_2$, 71.1 vol. % $N_2$; at the temperature of 485° C., at a space velocity of gas providing a constant contact time $\tau=0.9$ sec. The $SO_2$ concentration is measured at the inlet to and at the outlet the catalyst bed, and the degree of $SO_2$ conversion ($X_{init.}$) is assessed from the change of said concentrations, this being the measure of activity of the initial catalyst under the selected standard conditions.

The catalyst thermostability is determined by following the procedure of accelerated thermal aging (G. K. Boreskov, Catalysis in Sulfuric Acid Production, Moscow, Goskhimizdat, 1954, p. 153). According to this procedure, first the initial activity of the catalyst at 485° C. is determined ($X_{init.}$), then the temperature is raised to 700° C. and the catalyst is maintained at this temperature for 50 hours. After that the temperature in the flow reactor is lowered to 485° C., and at this temperature the residual activity of the sample ($X_{resid.}$) is measured.

Besides, for evaluation of the thermal stability, the activity is measured at 700° C. on a highly concentrated feed gas: 20 vol. % $SO_2$, 20 vol. % $O_2$, and 60 vol. % $N_2$. The measure of the catalysts activity is adopted to be the contact time ($\tau$, sec.) necessary for attaining a certain constant degree of conversion $X_{const}$, away from the reaction equilibrium. Since under the above-indicated test conditions the equilibrium degree of conversion is $X_{eq}$~51%, for comparing the activities we have chosen a constant $X_{const}$=39%. Initial contact times $\tau_{init.}$ and the contact times after testing at 700° C. for 50 hours $\tau_{final}$ were measured. Small $\tau$ values and their constancy during prolonged tests at 700° C. testify to the high activity and thermostability of the catalysts.

The catalysts are tested in the reaction of ammonia oxidation to nitrogen oxides, in the reaction of selective reduction of nitrogen oxides with methane, in the reaction of alkylation isobutane with butylene.

The data on the composition and properties of the support are presented in Table 1, in FIGS. 1, 2, Samples 1, 2.

The data on the composition of the catalysts are presented in Table 2.

The data of tests are presented in Tables 3–7.

For a better understanding of the present invention, the following particular examples are presented.

Preparing the Carrier:

Sample No. 1

For preparing the support, unleached sodium silicate glass cloth is used, having the composition: 70% $SiO_2$, 20% $Na_2O$, 6% $Al_2O_3$, the balance being $H_2O$.

The glass cloth is treated for 2 hours with a solution having the composition 5% $NH_3$+5% $H_2O_2$ in the mode of pneumatic pulsating mixing at a pressure of 0.06 MPa, pulsation frequency of 1.5 Hz, pulsation amplitude of 150 mm and washed with water at pH=5.5–7.0. Then the cloth is treated with 5% HCl for 3 minutes, then at the temperature of 40° C. for 120 minutes, washed out with water till the washwater pH of 5.5–7.0, and then calcined at the temperature of 200° C. for 12 hours.

Sample No. 2

Glass cloth of the same composition as in Sample No. 1 is calcined at 330±20° C. for 2 hours, then treated with 7.5% $HNO_3$ at 90° C. for 60 minutes, washed out with water till pH=6.5–7.0, then heat treatment is carried out in a stream of air at 350° C. for 12 hours.

Samples Nos. 5–7 are similar to Sample No. 1, differing only in the composition of the support and in the ratio $Q_3/Q_4$, $S_{Ar}$, $S_{Na}$, $S_{Na}/S_{Ar}$.

The catalysts exemplified hereinbelow are prepared using a support with optimal claimed characteristics (Sample No. 1, 2).

EXAMPLE 1

To 10 g of a glass cloth support with the characteristics of Sample No. 1 (Table 1) there are added 50 ml of a solution of tetrammineplatinum (II) chloride [$Pt(NH_3)_4$]$Cl_2$ with the concentration of 0.05 g Pt/100 ml of solution and kept at t=120° C. and superatmosheric pressure of 1 atmosphere for 12 hours. Then the sample is separated from the impregnating solution and washed out with 10-fold excess of distilled water at room temperature. The sample is then dried in air at 110° C. for 10 hours, calcined in air at 300° C. for 2 hours, and reduced in a stream of hydrogen at 300° C. for 2 hours. The resulting catalyst (Sample No. 1 in Table 2) contains 0.01% Pt. The catalyst (Sample No. 1) was tested in the reaction of deep oxidation of n-butane, propane and CO (Table 3), in the reaction of oxidation of sulfurous anhydride to sulfuric anhydride (Table 4), and in the reaction of selective reduction of nitrogen oxides with methane (Table 7).

EXAMPLE 2

To 10 g of a glass cloth support with the characteristics of Sample No. 2 (Table 1) there are added 50 ml of $CsNO_3$ solution with the concentration of 0.5 g Cs/100 ml, kept at 100° C. and superatmospheric pressure of 1 atmosphere for 6 hours, then washed out with a 5-fold excess of distilled water and dried in air at 20° C. for 10 hours. The resulting modified support is impregnated with a solution of ($NH_4$)$_2$ [$PtCl_6$] with pH=10 at t=200° C. and pressure of 14 gage atmospheres for 12 hours. Then the sample is washed with distilled water acidulated to pH=3, dried in air at 110° C., calcined in air at 200° C. for 2 hours, and reduced in a stream of hydrogen at 200° C. for 2 hours.

The catalyst contains 0.02% Pt and 0.2% Cs.

EXAMPLE 3

To 10 g of a glass cloth support with the characteristics of Sample No. 2 (Table 1) there are added 50 ml of a solution of [$Pt(NH_3)_4$]$Cl_2$ with the concentration of 0.05 g Pt/100 ml and kept at t=150° C. and superatmospheric pressure of 4 atmospheres. Then the sample is washed out with a 3-fold excess of distilled water to which ammonia is added to pH=8, dried in air at 150° C. for 10 hours, calcined in air at 350° C. for 2 hours, and reduced in a stream of hydrogen at 200° C. for 2 hours.

The catalyst contains 0.01% Pt (Table 2).

EXAMPLE 4

To 10 g of a glass cloth support with the characteristics of Sample No. 1 (Table 1) there are added 50 ml of a solution containing 0.8 g of $PdCl_2$+0.1 g of CsCl+5 g of HCl and kept at t=40° C. and superatmospheric pressure of 1 atmosphere for 8 hours. Then the sample is washed out with a 5-fold excess of distilled water, dried in air at 110° C. for 10 hours, calcined in air at 200° C. for 3 hours, and reduced in hydrogen at 200° C. for 3 hours.

EXAMPLES 5–14

Catalysts are prepared as in Example 1, the difference being in the composition of the introduced catalytic compounds, in their amount, and in the conditions of contacting with the support, as well as in the conditions of introducing additional elements. The data are presented in Table 2.

INDUSTRIAL APPLICABILITY

The proposed support may be used in chemical industry for preparing various catalysts for heterogeneous reactions, as well as in most diverse fields of engineering: in making inorganic membranes, in chromatographic columns, for producing fiber optic materials, in the manufacture of filters, etc.

TABLE NO. 1

Composition and properties of support

| Nos. | SiO$_2$ wt. % | Other components, wt. % | Integral intensity of chemical shift line Q$^3$ −100 ppm ± 3, % | Integral intensity of chemical shift line Q$^4$ −110 ppm ± 3, % | Ratio of chemical shift lines Q$^3$/Q$^4$ intensities | Presence of 3620–3650 cm$^{-1}$ absorption band in IR spectrum (FIG. 2) | S$_{Ar}$, m$^2$/g | S$_{Na}$, m$^2$/g | S$_{Na}$/S$_{Ar}$ |
|---|---|---|---|---|---|---|---|---|---|
| 1 | 96.5 | Al$_2$O$_3$, 3.4<br>Na$_2$O, 0.1 | 47 | 53 | 0.9 | + | 1.2 | 23 | 19 |
| 2 | " | Al$_2$O$_3$, 3.4<br>Na$_2$O, 0.1 | 41 | 53 | 0.7 | + | 1.5 | 16 | 10.1 |
| 3* | " | Al$_2$O$_3$, 3.4<br>Na$_2$O, 0.1 | 3 | 97 | 0.03 | − | 1.2 | 3.8 | 3.2 |
| 4* | 99.6 | Na$_2$O, 0.1<br>Al$_2$O$_3$, 0.3 | 10 | 90 | 0.11 | − | 10 | 10 | 1 |
| 5 | 99.9 | Na$_2$O, 0.1 | 55 | 45 | 1.2 | + | 1.7 | 51 | 30 |
| 6 | 70.0 | Al$_2$O$_3$, 10<br>B$_2$O$_3$, 6<br>MgO, 2.5<br>CaO, 8.5<br>Na$_2$O, 2.5<br>TiO$_2$ + Fe$_2$O$_3$, 0.5 | 52 | 48 | 1.1 | + | 30 | 250 | 8.3 |
| 7 | 61.0 | Al$_2$O$_3$, 12.6<br>B$_2$O$_3$, 8.2<br>MgO, 3.5<br>CaO, 11.0<br>Na$_2$O, 3.0<br>TiO$_2$ + Fe$_2$O$_3$, 0.7 | 52 | 48 | 1.1 | + | 10 | 100 | 10 |

*Samples 3, 4 pertain to the known solutions shown in FIGS. 1, 2 and are presented for comparison with the claimed support.

TABLE NO. 2

Composition of catalysts and conditions for their preparation

| Nos. | No. of support sample From Table 1 | Catalyst component, wt. % | T °C. of catalytic component incorporation | P, atm* | pH | Additional element of Group 1, 2, 3, 4, wt. % | Washing ("+" - yes, "−" - no) | T °C. of heat treatment |
|---|---|---|---|---|---|---|---|---|
| 1 | 1 | Pt, 0.01 | 120 | 1 | 7 | — | + | 300, air + 300, H$_2$ |
| 2 | 2 | Pt, 0.02 | 200 | 14 | 10 | Cs, 0.2 before contact with catalyst component | +<br>pH = 3 | 200, air + 200, H$_2$ |
| 3 | 2 | Pd, 0.01 | 150 | 4 | 7 | — | +<br>pH = 8 | 350, air + 200, H$_2$ |
| 4 | 1 | Pd, 0.1 | 40 | 1 | 3 | Cs, 0.01 simultaneously with catalyst component | + | 200, air + 200, H$_2$ |
| 5 | 2 | Mn, 1.5<br>Au, 0.01 | 100 | 1.3 | 2 | K, 0.1 before contact with catalyst component | + | 300, air |
| 6 | 1 | Ni, 0.5<br>Co, 0.5 | 100 | 1.3 | 3 | Mg, 1 simultaneously with catalyst component | − | 350, air + 300, H$_2$ |
| 7 | 2 | Cu, 1.0<br>Cr, 0.5 | 40 | 1 | 4 | Ca, 0.5 after contact with catalyst component | − | 350, air |
| 8 | 1 | Ag, 0.05<br>Ir, 0.01 | 100 | 1 | 6 | Al, 0.7 before contact with catalyst component | + | 300, air + 200 H$_2$ |
| 9 | 2 | Zr, 1.7<br>Fe, 0.3 | 110 | 1.1 | 5 | Si, 1.5 before contact with catalyst component | − | 800, air |
| 10 | 1 | Ni, 0.5<br>Pd, 0.1<br>Sn, 0.1 | 50 | 1.0 | 7 | Ca, 0.1 before contact with catalyst component | + | 100, in vacuum, 10$^{-4}$ Hg |
| 11 | 2 | Mo, 0.5<br>Pt, 0.1<br>Rh, 0.001 | 150 | 200 | 7 | — | + | 300, air + 300, H$_2$ |

TABLE NO. 2-continued

Composition of catalysts and conditions for their preparation

| Nos. | No. of support sample From Table 1 | Catalyst component, wt. % | T °C. of catalytic component incorporation | P, atm* | pH | Additional element of Group 1, 2, 3, 4, wt. % | Washing ("+" - yes, "−" - no) | T °C. of heat treatment |
|---|---|---|---|---|---|---|---|---|
| 12 | 1 | Pt, 1.0 | 120 | 1 | 7 | — | − | 300, air + 300, $H_2$ |
| 13 | 1 | Pt, 0.04 | 260 | 14 | 7 | Al, 0.1 before contact with catalyst component | + | 350, air |
| 14 | 1 | Pt, 0.15 | 260 | 14 | 7 | Al, 0.5 simultaneously with catalyst component | + | 350, air |

*P—superatmospheric pressure

TABLE NO. 3

Results of testing catalysts in the reaction of deep oxidation of hydrocarbons

| | Oxidation of n-butane | Oxidation of propane Flow method | | Oxidation of carbon oxide Flow method | |
|---|---|---|---|---|---|
| Catalyst No. (see Table 2 | Flow-circulation method Reaction rate, $W \cdot 10^2$, cm$^3$/g·s | Degree of conversion, X, % | $T_{reaction}$, °C. | Degree of conversion, X, % | $T_{reaction}$, °C. |
| 1 | 9.02 | — | — | 95 | 225 |
| 2 | 9.38 | — | — | 95 | 220 |
| '3 | 8.72 | 91 | 345 | 95 | 170 |
| | | 98 | 410 | | |
| 4 | 6.93 | — | | 95 | 190 |
| 5 | 5.49 | — | | 85 | 260 |
| 6 | 6.45 | — | | 85 | 315 |
| 7 | 8.91 | 92.5 | 430 | 85 | 280 |
| | | 98 | 500 | | |

TABLE 4

Tests of catalysts in the reaction of $SO_2$ oxidation to $SO_3$

| | Activity | | | |
|---|---|---|---|---|
| Catalyst No. (see Table 2) | Degree of conversion X, %, under standard test conditions 485° C., 10% $SO_2$, 18.9% $O_2$, 71.1% $N_2$, τ ~ 0.9 sec. | | Contact time t, sec. at 700° C., 20% $SO_2$; 20% $O_2$, 60% $N_2$, $X_{const}$ = 39% | |
| | $X_{init.}$ | $X_{resid.}$ | $τ_{init.}$ | $τ_{final}$ |
| 1 | 92.2 | 91.5 | 0.35 | 0.36 |
| 2 | 90.7 | 90.1 | 0.37 | 0.37 |
| 12 | 91.2 | 91.0 | 0.34 | 0.35 |

TABLE NO. 5

Results of testing catalysts in the reaction of alkylation of isobutane with n-butylene
Testing in an autoclave installation, T = 40° C., P = 10 atm.

| Catalyst No. (see Table 2) | Reaction components | Conversion, % | Yield of $C_5$ fraction on converted olefins, % | Selectivity for trimethyl pentanes, % |
|---|---|---|---|---|
| 9 | isobutane/n-butylene 1:25 | 95.6 | 81 | 45 |

TABLE 6

Results of testing catalysts in the oxidation of ammonia to nitrogen(II) oxide
Conditions: flow reactor; contact time is $3–5 \cdot 10^{-3}$ sec.
Linear velocity, 1.8–2 m/sec, P is 7 atm.

| Catalyst No. (see Table 2) | Initial concentration of ammonia, vol. % | Conversion of ammonia, % | Selectivity for nitrogen(II) oxide, % |
|---|---|---|---|
| 11 | 7 | >98 | 94 |

TABLE 7

Results of testing catalysts in the reaction of selective reduction of nitrogen oxides with methane and propane
Space velocity, h$^{-1}$: 20000

| Catalyst No. (see Table 2) | Concentration of components in inlet mixture | T ° C. test | Conversion of NO to NO$_2$, % |
|---|---|---|---|
| 1 | NO, 0.18 vol. % | 50–200 | 5 |
|   | CH$_4$ 1.48 vol. % | 300–400 | 40 |
|   | O$_2$, 2.60 vol. % | 500–600 | 30 |
|   | Ar, the balance | | |
| 2 | NO, 0.18 vol. % | 50–200 | 5 |
|   | CH$_4$ 1.48 vol. % | 300–400 | 45 |
|   | O$_2$, 2.60 vol. % | 500–600 | 30 |
|   | Ar, the balance | | |
| 13 | NO, 250 ppm | 50–200 | 30 |
|    | C$_3$H$_8$, 250 ppm | 300–400 | 60 |
|    | SO$_2$, 50 ppm | 500–600 | 30 |
|    | O$_2$, 10.0 vol. % | | |
|    | H$_2$O, 5.0 vol. % | | |
|    | Ar, the balance | | |
| 14 | NO, 250 ppm | 50–200 | 35 |
|    | C$_3$H$_8$, 250 ppm | 300–400 | 63 |
|    | SO$_2$, 50 ppm | 500–600 | 35 |
|    | O$_2$, 10.0 vol. % | | |
|    | H$_2$O, 5.0 vol. % | | |
|    | Ar, the balance | | |

The invention claimed is:

1. A silica-rich support comprising silicon oxide and non-silica-containing oxides, wherein the $^{29}$Si MAS NMR spectrum the state of silicon in the support is characterized by the presence of lines with chemical shifts $-100\pm3$ ppm (line Q$^3$) and $-110\pm3$ ppm (line Q$^4$), with the ratio of the integral intensities of the lines Q$^3$/Q$^4$ of from 0.7 to 1.2, in the infrared spectrum there is an absorption band of hydroxyl groups with the wave number 3620–3650 cm$^{-1}$ and half-width 65–75 cm$^{-1}$, and the silica-rich support has a specific surface area as measured by the BET techniques from the thermal desorption of argon, S$_{Ar}$=0.5–30 m$^2$/g, and the surface, as measured by alkali titration techniques, S$_{Na}$=10–250 m$^2$/g, with the ratio S$_{Na}$/S$_{Ar}$=5–30.

2. A silica-rich support according to claim 1, wherein the content of hydroxyl groups (OH groups) is in the range of from one hydroxyl group per silicon atom to one hydroxyl group per 2 silicon atoms (OH/Si=1–0.5).

3. A silica-rich support according to claim 1, wherein the amount of silicon oxide is 60–99.9 percent by weight.

4. A silica-rich support according to claim 1, wherein the amount of silicon oxide is more than 70 percent by weight.

5. A silica-rich support according to claim 1, which further contains at least one metal of Groups I and II of the Periodic System of the Elements, an oxide thereof, or both in an amount not exceeding 1 percent by weight.

6. The silica rich support according to claim 5, which contains the at least one metal and the oxide thereof.

7. A silica-rich support according to claim 1, which is in a form selected from the group consisting of fibers, woven and nonwoven materials, cylindrical and spherical granules, and single- and multi-channel tubes.

8. A catalyst for heterogeneous reactions, comprising a catalytic component in a silica-rich support comprising silicon oxide and non-silicon-containing oxides, wherein in the support the state of silicon in the $^{29}$Si MAS NMR spectrum is characterized by the presence of lines with chemical shifts $-100\pm3$ ppm (line Q$^3$) and $-100\pm3$ ppm (line Q$^4$), with the ratio of the integral intensities of the lines Q$^3$/Q$^4$ of from 0.7 to 1.2, in the infrared spectrum there is an absorption band of hydroxyl groups with the wave number 3620–3650 cm$^{-1}$ and half-width 65–75 cm$^{-1}$, and the support has a specific surface area, as measured by the BET techniques form the thermal desorption of argon, S$_{Ar}$=0.5–30 m$^2$/g, and the surface, as measured by alkali titration techniques, S$_{Na}$=10–250 m$^2$/g, with the ratio S$_{Na}$/S$_{Ar}$=5–30.

9. A catalyst for heterogeneous reactions according to claim 8, wherein the support is in a form selected from the group consisting of fibers, woven and nonwoven materials, cylindrical and spherical granules, and single- and multi-channel tubes.

10. A catalyst for heterogeneous reactions according to claim 8, wherein the catalytic component comprises at least one metal which is present as a metal, as a component of a metal oxide or both, said at least one metal being selected from the group consisting of platinum, palladium, rhodium, iridium, silver, zirconium, chromium, cobalt, nickel, manganese, copper, tin, gold, titanium, iron, and molybdenum, the at least one metal being present in the catalyst in an amount not exceeding 2 percent by weight.

11. A catalyst for heterogeneous reactions according to claim 8, which further contains at least a second metal which is present as a metal, as a component of metal oxide or both, the second metal being selected from the group consisting of Groups 1, 2, 3, and 4 of the Periodic System of the Elements, the second metal being present in the catalyst in an amount not exceeding 1.5 percent by weight.

12. The silica rich support according to claim 11, which contains the second metal and the oxide thereof.

13. A catalyst for heterogeneous reactions according to claim 8, wherein said catalytic component comprises at least one metal which is present as a metal, as a component of a metal oxide or both, said at least one metal being selected from the group consisting of platinum, palladium, manganese, nickel, cobalt, copper, and chromium, the at least one metal being present in the catalyst in an amount of 0.01–1.5 percent by weight, for deep oxidation of hydrocarbons.

14. A catalyst for heterogeneous oxidation according to claim 8, wherein said catalytic component comprises at least one metal which is present as a metal, as a component of a metal oxide or both, said at least one metal being selected from the group consisting of platinum, palladium, rhodium, and iridium, said at least one metal being present in an amount of 0.05–1.0 percent by weight, for oxidation of sulfur dioxide into sulfur trioxide.

15. A catalyst for heterogeneous reactions according to claim 8, wherein said catalytic component comprises zirconium in an amount of up to 2 percent by weight, for alkylation of hydrocarbons.

16. A catalyst for heterogeneous reactions according to claim 8, wherein said catalytic component comprises platinum in an amount of up to 0.15 percent by weight and aluminum, present as a metal, as a component of a metal oxide or both, in an amount of up to 0.5 percent by weight, for selective reduction of nitrogen oxides by hydrocarbons in excess oxygen.

17. A process for the preparation of a catalyst for heterogeneous reactions, comprising the steps of:
   a) contacting a silica-rich support comprising silicon oxide and non-silica-containing oxides, wherein in the $^{29}$Si MAS NMR spectrum the state of silicon in the support is characterized by the presence of lines with chemical shifts $-100\pm3$ ppm (line Q$^3$) and $-100\pm3$ ppm (line Q$^4$), with the ratio of the integral intensities of the lines Q$^3$/Q$^4$ of from 0.7 to 1.2, in the infrared spectrum there is an absorption band of hydroxyl groups with the wave number 3620–3650 cm$^{-1}$ and half-width 65–75 cm$^{-1}$, and the silica-rich support has a specific surface area, as measured by the BET techniques from the thermal desorption of argon, $S_{Ar}$, 0.5–30 m$^2$/g, and the surface, as measured by alkali titration techniques, $S_{Na}$=10–250 m$^2$/g, with the ratio $S_{Na}/S_{Ar}$=5–30, with a solution of a compound of a catalytic component at a temperature of 40–200° C. and superatmospheric pressure of 1–200 atmospheres; and b) conducting a heat treatment of the product obtained in step (a).

18. A process for the preparation of a catalyst for heterogeneous reactions according to claim 17, wherein said solution of a compound of a catalytic component has a pH of 2–10.

19. A process for the preparation of a catalyst for heterogeneous reactions according to claim 17, wherein said solution of a compound of the catalytic component additionally contains at least one compound of an element selected from the group consisting of Groups 1, 2, 3, and 4 of the Periodic System of the Elements in an amount not exceeding 1.5 percent by weight.

20. A process for the preparation of a catalyst for heterogeneous reactions according to claim 17, comprising, before contacting the support with the solution of a compound of a catalytic component, impregnating the support with at least one compound of an element selected from the group consisting of Groups 1, 2, 3, and 4 of the Periodic System of the Elements in an amount not exceeding 1.5 percent by weight.

21. A process for the preparation of a catalyst for heterogeneous reactions according to claim 17, comprising, after contacting step (a), impregnating the support with at least one compound of an element selected from the group consisting of Groups 1, 2, 3, and 4 of the Periodic System of the Elements in an amount not exceeding 1.5 percent by weight.

22. A process for the preparation of a catalyst for heterogeneous reactions according to claim 17, wherein after said contacting step (a) said catalyst is washed with a 3–10-fold excess of water having a pH of 3–8.

23. A process for the preparation of a catalyst for heterogeneous reactions according to claim 17, wherein said heat treatment is carried out at a temperature of 100–800° C. in a gaseous medium or in vacuum down to 10$^{-4}$ mm Hg.

* * * * *